United States Patent
Crane et al.

(10) Patent No.: US 8,579,535 B2
(45) Date of Patent: Nov. 12, 2013

(54) MICRO-COUPLING ACTIVE RELEASE MECHANISM

(75) Inventors: William Mike Crane, Monterey, CA (US); Paul Michael Oppenheimer, Edgewater, MD (US); Marcello Romano, Monterey, CA (US); James Hansen Newman, Pacific Grove, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 117 days.

(21) Appl. No.: 12/878,760

(22) Filed: Sep. 9, 2010

(65) Prior Publication Data

US 2011/0299915 A1    Dec. 8, 2011

Related U.S. Application Data

(60) Provisional application No. 61/242,637, filed on Sep. 15, 2009.

(51) Int. Cl.
*F16B 1/00* (2006.01)
(52) U.S. Cl.
CPC .................................. *F16B 1/0014* (2013.01)
USPC ......................................................... 403/28
(58) Field of Classification Search
USPC .......... 403/28–30, 109.3, 229, 260, 325, 327, 403/359.4; 29/447, 450, 525, 525.01, 29/525.11
See application file for complete search history.

(56) References Cited

U.S. PATENT DOCUMENTS

| | | | | |
|---|---|---|---|---|
| 3,416,823 A | * | 12/1968 | Auer | 403/408.1 |
| 4,402,617 A | * | 9/1983 | McDowell | 384/95 |
| 5,033,779 A | * | 7/1991 | Geringer et al. | 292/251.5 |
| 5,119,555 A | * | 6/1992 | Johnson | 29/254 |
| 5,120,175 A | * | 6/1992 | Arbegast et al. | 411/501 |
| 5,265,456 A | * | 11/1993 | Kennedy et al. | 72/342.7 |
| 5,271,975 A | * | 12/1993 | Solano | 428/34.9 |
| 5,536,126 A | * | 7/1996 | Gross | 411/411 |
| 5,988,484 A | * | 11/1999 | Osborn et al. | 228/126 |
| 6,139,261 A | * | 10/2000 | Bishop et al. | 415/148 |
| 6,338,599 B1 | * | 1/2002 | Uno | 411/386 |
| 6,565,367 B2 | * | 5/2003 | Budman et al. | 439/82 |
| 6,594,455 B2 | * | 7/2003 | Lee | 399/90 |
| 6,729,765 B2 | * | 5/2004 | Ni et al. | 384/295 |
| 6,865,791 B2 | * | 3/2005 | Cook et al. | 29/447 |
| 7,217,059 B1 | * | 5/2007 | Rudduck | 403/324 |
| 7,699,556 B2 | * | 4/2010 | Efremov | 403/337 |
| 2008/0203760 A1 | * | 8/2008 | Cafeo et al. | 296/146.9 |

OTHER PUBLICATIONS

"Qwknut 3K." Product Flyer. 1 p. [retrieved on Sep. 28, 2010]. Retrieved from the Internet: <URL: http://www.oh1sa.net/data/satellite/cubesat/P-POD-mk2/qwknut3k.pdf>.

(Continued)

*Primary Examiner* — Daniel P. Stodola
*Assistant Examiner* — Nahid Amiri
(74) *Attorney, Agent, or Firm* — Lisa A. Norris

(57) ABSTRACT

A micro-coupling active release mechanism including a shape memory alloy (SMA) cylindrical ring that is fit into a bushing or other mating attachment creating an interference joint held in place by frictional forces. The interference joint can be released upon actuation in which the SMA cylindrical ring is heated causing it to shrink in size, relieving the frictional forces of the interference joint thereby releasing the SMA cylindrical ring from the bushing or other mating attachment.

10 Claims, 8 Drawing Sheets

(56) References Cited

OTHER PUBLICATIONS

"Pinpuller Concept." Product Flyer. 1 p. [retrieved on Sep. 9, 2010]. Retrieved from the Internet: <URL: http://www.tiniaerospace.com/pdf/pinpullerconcept.pdf>.

"A Low-cost, Compact, Non-explosive Pin-puller for Aerospace Applications". 1 p. Optional PowerPoint file. [retrieved on Sep. 28, 2010]. Retrieved from the Internet: <URL: http://http://sbir.nasa.gov/SBIR/successes/ss/3-039text.html>.

Ortiona, Christopher, Jenkins, R.D., Malone, C.S., Dorn, L.T., Schroer, M.P., Schulenburg, A., Oppenheimer, P.M., Crane, W.M., Sakoda, D. Romano, M., Panholzer, R., and Newman, J.H. "The Naval Postgraduate School SCAT++ CubeSat Program." 23rd Annual AIAA/USU Conference of Small Satellites, Aug. 10-13, 2009. pp. 1-8.

"Frangibolt Actuator Model FC2-16-31SR." Product Sheet. 1 p. [retrieved on Sep. 9, 2010]. Retrieved from the Internet: <URL: http://www.tiniaerospace.com/fbt/fbfc2-16-31sr2.html>.

"Squiggle Motors." 2 pp. [retrieved on Sep. 9, 2010]. Retrieved from the Internet: <URL: http://shop.newscaletech.com/productcart/pc/viewCategories.asp?idCategory=3>.

"Shape Memory Alloys." 1 p. [retrieved on Sep. 9, 2010]. Retrieved from the Internet: <URL: http://www.tiniaerospace.com/pdf/SHAPE_MEMORY_ALLOY_Intro.pdf>.

\* cited by examiner

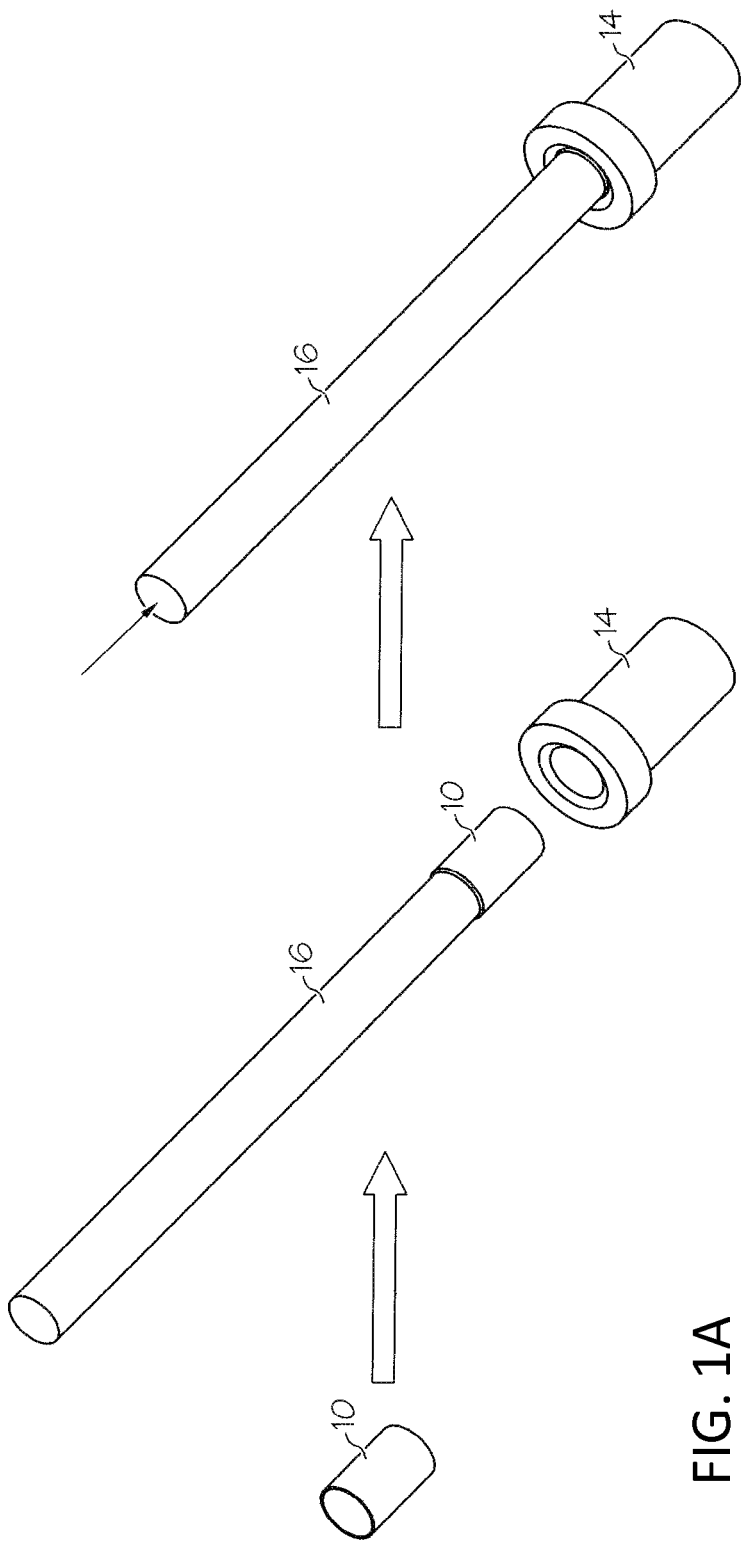

MICRO-COUPLING ACTIVE RELEASE MECHANISM

CROSS-REFERENCE TO RELATED APPLICATIONS

This application claims the benefit of U.S. Provisional Patent Application No. 61/242,637, filed Sep. 15, 2009, which is hereby incorporated in its entirety by reference.

BACKGROUND OF THE INVENTION

1. Field of the Invention

The present invention relates generally to release mechanisms. More specifically, the present invention relates to actively commanded release mechanisms.

2. Description of the Related Art

The ability to deploy or release connected parts of a device or machine by a mechanism that is secure under extreme forces, yet will reliably actuate when commanded to do so, is extremely useful in situations where a latch or fastener is needed. Additionally, in many design situations, constraints of small size, mass, and operating power make use of several existing actuators impractical due to their complexity and inability to scale to the required size.

Many existing release mechanisms use moving parts and have the need for lubrication. For example, the SQUIGGLE® Motor developed by New Scale Technologies consists of several piezoelectric ceramic actuators that change shape when electrically excited. These actuators are then attached to a threaded nut with a mating screw threaded inside that nut. Applying power to the actuators creates ultrasonic vibrations causing the nut to vibrate in an orbit. The nut's rotation moves the threaded mating screw in-and-out with a linear motion. For this example, both the micro-parts and lubrication needs of the mechanism lead to the possibility of binding and failure.

Some other existing release mechanisms are Non-Explosive Actuators (NEAs). Three NEA designs commonly used for actuation needs are: the Qwknut® designed by Starsys or NEA Split Spool Actuator by NEA Electronics Inc. used on the Cal Poly P-Pod (Poly Pico-satellite Orbital Dispenser); the FRANGIBOLT® actuator model FC2-16-31SR2; and the TiNi Pinpuller® both produced by TiNi Aerospace. The aforementioned NEAs are proven and reliable, but some may be too large for installation within small devices or could impart actuation shock to the system causing damage. In addition, some NEAs can be complex or draw excessive power leading to an increase in the number of failure modes for the actuator and the system using it.

SUMMARY OF THE INVENTION

In accordance with one embodiment, a micro-coupling active release mechanism includes: a bushing connectable to a first component, the bushing having a recess for receiving a shape memory alloy (SMA) cylindrical ring; a shape memory alloy (SMA) cylindrical ring connectable to a second component, wherein the SMA cylindrical ring is fit into the recess of the bushing to form an interference joint that is releasable when the SMA cylindrical ring is heated to a transformation temperature that causes it to reduce in size. In one embodiment, the active release mechanism further includes a heating device for heating at least the SMA cylindrical ring to the transformation temperature. In one embodiment, the SMA cylindrical ring is made of a material that transforms at the transformation temperature from a larger martensitic phase diameter to a smaller austenitic phase diameter when heated at or above the transformation temperature.

In accordance with a further embodiment, a method for releasably coupling a first component to a second component includes: fitting a shape memory alloy (SMA) cylindrical ring into a bushing to create an interference joint; passing a bolt shaft of retaining bolt through an interior diameter of the SMA cylindrical ring, a portion of the bolt shaft extending out and from the SMA cylindrical ring, a bolt head of the retaining bolt catching on the SMA cylindrical ring and not passing through the SMA cylindrical ring; attaching the bushing to the first component; and attaching the SMA cylindrical ring to the second component using the portion of the bolt shaft extending out and from the SMA cylindrical ring; wherein heating the SMA cylindrical ring at or above a transformation temperature causes the SMA cylindrical ring to transform from a larger martensitic phase diameter to a smaller austenitic phase diameter and to release the interference joint allowing the first component to separate from the second component.

Embodiments in accordance with the invention are best understood by reference to the following detailed description when read in conjunction with the accompanying drawings.

BRIEF DESCRIPTION OF THE DRAWINGS

FIGS. 1A-1C are perspective views of the assembly of a micro-coupling interference joint in accordance with one embodiment;

DETAILED DESCRIPTION OF THE INVENTION

Figure 1D:
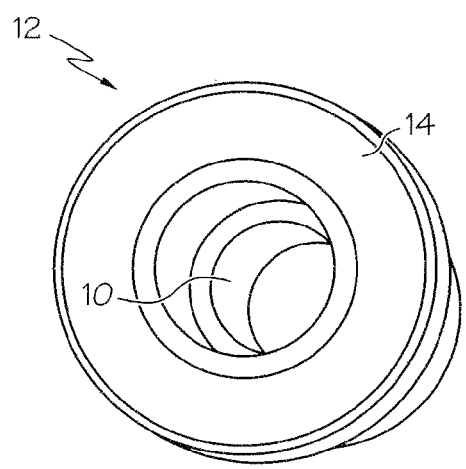
FIG. 1D is a top view of the micro-coupling interference joint assembled according to FIG. 1A.
Figure 1E:
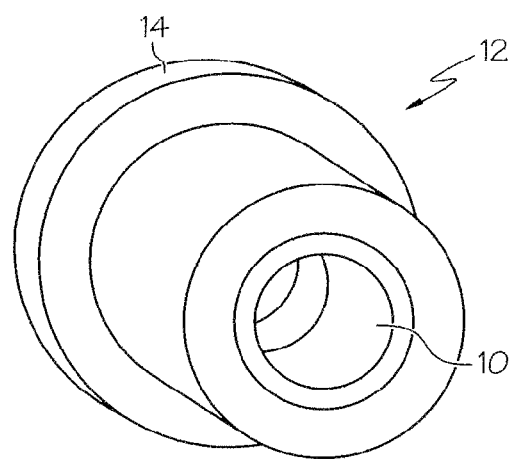
FIG. 1E is a bottom view of the micro-coupling interference joint assembled according to FIG. 1A.

Broadly viewed, embodiments in accordance with the micro-coupling active release mechanism include a shape memory alloy (SMA) cylindrical ring that is press-fit into a bushing or other mating attachment and held in place by frictional forces between the SMA cylindrical ring and the bushing or other mating attachment. Upon heating of the SMA cylindrical ring, the SMA cylindrical ring reduces in diameter and releases from the bushing or other mating attachment. More specifically, the press-fit SMA cylindrical ring creates an interference joint between the bushing or other mating attachment. This interference joint is releasable upon activation of the SMA cylindrical ring via conductive or direct current thermal heating which shrinks the press-fit SMA cylindrical ring. When the press-fit SMA cylindrical ring shrinks, the frictional force is relieved allowing the SMA cylindrical ring to separate from the bushing or other mating attachment. As can be understood by those of skill in the art from the following description, embodiments in accordance with the micro-coupling active release mechanism can be adapted to accommodate the available volume of a given environment.

Embodiments in accordance with the micro-coupling active release mechanism provide a simple and reliable release mechanism having a minimal number of parts. In some embodiments, the release mechanism can be used to release components with a simple, single-motion actuation. In some embodiments, the micro-coupling active release mechanism can have a small size, small mass and small actuation power requirements. This allows for use of the micro-coupling active release mechanism in very small devices while minimizing the possibility of failure by reducing the number and complexity of the parts. Some embodiments of the micro-coupling active release mechanism can be useful for many applications in system design, such as safety devices, tamper locks, robotics, aeronautics, military, marine and spacecraft systems.

Referring to FIGS. 1A, 1B, 1C, 1D and 1E, one exemplary embodiment of a method for press-fitting a SMA cylindrical ring 10 into a bushing 14 to create an interference joint 12 is described. In one embodiment, SMA cylindrical ring 10 has an inner diameter and an outer diameter, as well as a wall thickness and a length. In one embodiment, SMA cylindrical ring 10 is formed of a shape memory alloy (SMA) material capable of having both an austenitic phase and a martensitic phase.

In one embodiment, SMA cylindrical ring 10 is press-fit into bushing 14 using a cold-press method. For example, in one embodiment, SMA cylindrical ring 10 is inserted into bushing 14 in a cold twinned or cold de-twinned martensitic phase. This cold-press method forms a stronger interference joint 12, keeps the outer diameter of SMA cylindrical ring 10 small, and achieves a greater reduction in the outer diameter of SMA cylindrical ring 10 upon heating to ensure successful decoupling from bushing 14.

In another embodiment, SMA cylindrical ring 10 is press-fit into bushing 14 using a shrink-fit method. For example, in one embodiment, SMA cylindrical ring 10 is heated to its austenitic phase, inserted into bushing 14, and allowed to cool and expand into its martensitic phase, thereby creating interference joint 12. As illustrated in FIG. 1A, an insertion tool 16 can be used to insert SMA cylindrical ring 10 into bushing 14 using either the cold-press or shrink-fit method.

In one embodiment, bushing 14 has an inner diameter for receiving SMA cylindrical ring 10. When SMA cylindrical ring 10 is press-fit into bushing 14, frictional forces between the outer diameter of press-fit SMA cylindrical ring 10 against the interior wall of bushing 14 create the holding power of interference joint 12. To effect release of interference joint 12, SMA cylindrical ring 10 is heated to its austenitic phase and reduces in outer diameter. This reduction in outer diameter relieves the frictional forces between SMA cylindrical ring 10 and bushing 14 allowing release of SMA cylindrical ring 10 from bushing 14.

In one embodiment, interference joint 12 is utilized as part of a micro-coupling active release mechanism; interference joint 12 provides the frictional holding force to allow two components, i.e., a first component and a second component, to be coupled together until the activation of the micro-coupling active release mechanism effected by shrinking SMA cylindrical ring 10 on application of heat. In one embodiment, SMA cylindrical ring 10 can be formed of a pseudoelastic alloy, such as a "G" type nickel titanium (NiTi) alloy, such as one provided by Intrinsic Devices, Inc., that has activation "Heat to Recover" (HTR) temperatures of 95-105° C., e.g., transformation temperatures of 95-105° C. Heating of the pseudoelastic alloy to a temperature within the associated HTR temperature range initiates a phase change in which the larger martensitic phase diameter of SMA cylindrical ring 10 is reduced to its smaller austenitic phase diameter.

In one embodiment, a relatively high onset activation temperature, e.g., relatively high onset transformation temperature, is utilized to be high enough to prevent unintentional activation of SMA cylindrical ring 10, yet require little power to actuate. The change in the inner and outer diameters of SMA cylindrical ring 10 upon heating results from a change in the atomic positions within the NiTi alloy when transitioning from martensite to austenite. In various embodiments, SMA cylindrical ring 10 can be formed using one or more substances having different material properties allowing for a wide range of micro-coupling actuation characteristics.

In one embodiment, SMA cylindrical ring 10 can be press-fit into bushing 14 in accordance with a specified set of interference values used to create a needed coupling force in resulting interference joint 12. In one embodiment, the inner diameter of bushing 14 can be set to be greater than the recovered or reduced (memory) size of SMA cylindrical ring 10, thereby allowing SMA cylindrical ring 10 to free itself from bushing 14 upon activation, i.e., heating of SMA cylindrical ring 10 to a transformation temperature, e.g., HTR. SMA cylindrical ring 10 can be manufactured with a predetermined thickness and length sufficient to yield enough change in diameter upon activation to ensure release from bushing 14 and also have enough strength to avoid failure in tension, compression and/or shear when placed under load.

Referring to FIGS. 2A through 2D, one embodiment of a micro-coupling active release mechanism 22 is described. In the present embodiment, for purposes of description it can be assumed that micro-coupling active release mechanism 22 is for coupling a first component (not shown) to a second component (not shown). Further, for purposes of description, bushing 14 is attachable to a first component and SMA cylindrical ring 10 is attachable to a second component.

Figure 2A:
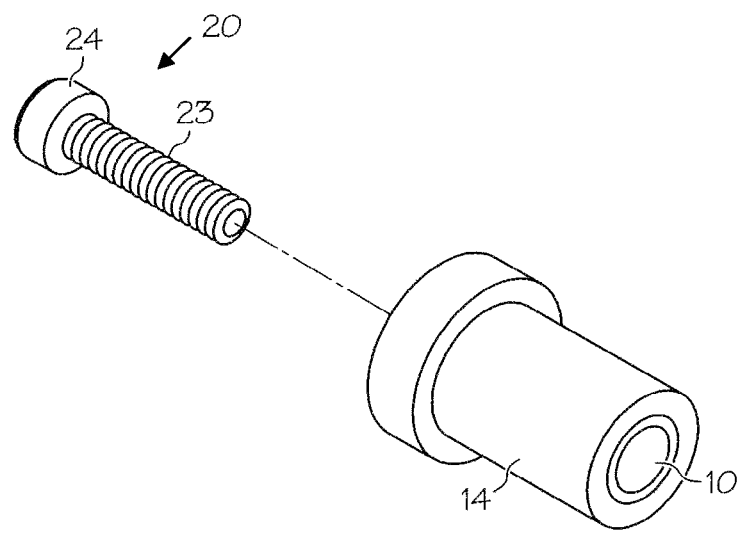
FIG. 2A is a perspective view of the assembly of a micro-coupling active release mechanism in accordance with one embodiment.
Figure 2B:
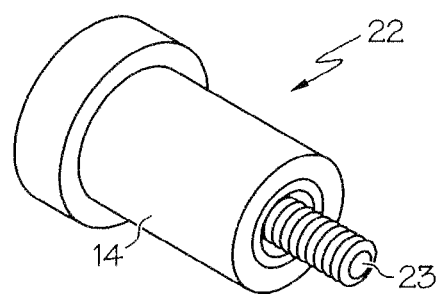
FIG. 2B is a perspective view of the assembled micro-coupling active release mechanism of FIG. 2A.
Figure 2C:
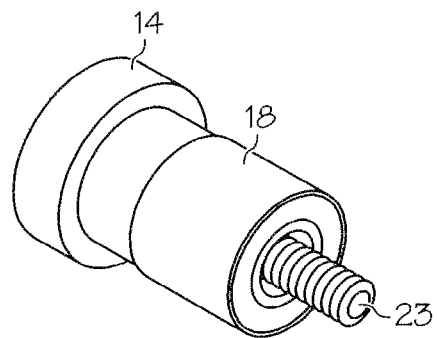
FIG. 2C is a perspective view of the assembled micro-coupling release mechanism of FIG. 2B with heat applied thereto.
Figure 2D:
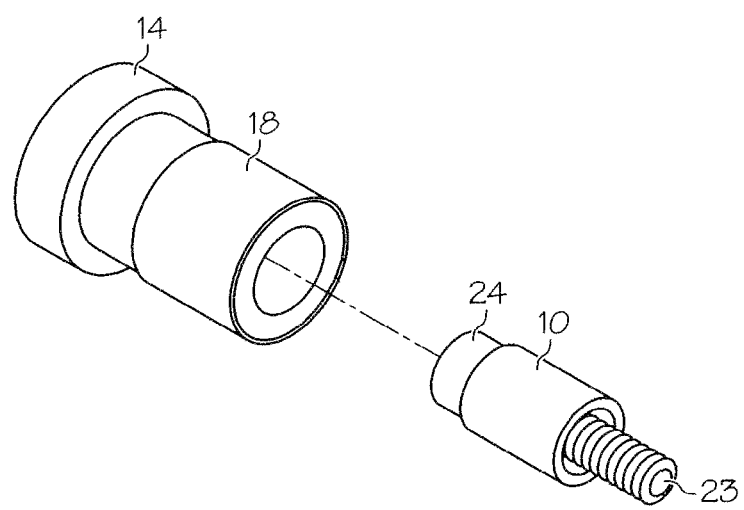
FIG. 2D is a perspective view of the micro-coupling release mechanism of FIG. 2B after application of heat and release thereof.
Figure 3A:
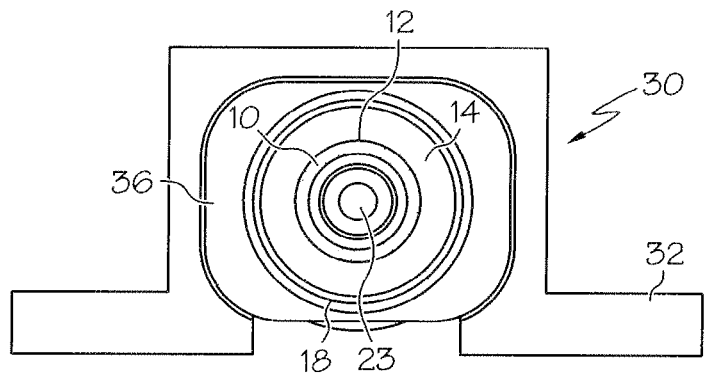
FIG. 3A is a back end view of an assembled micro-coupling active release mechanism in accordance with one embodiment.
Figure 3B:
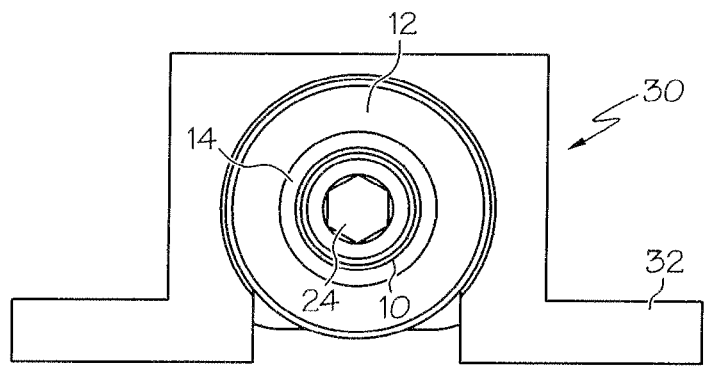
FIG. 3B is a front end view of the assembled micro-coupling active release mechanism of FIG. 3A.
Figure 3C:
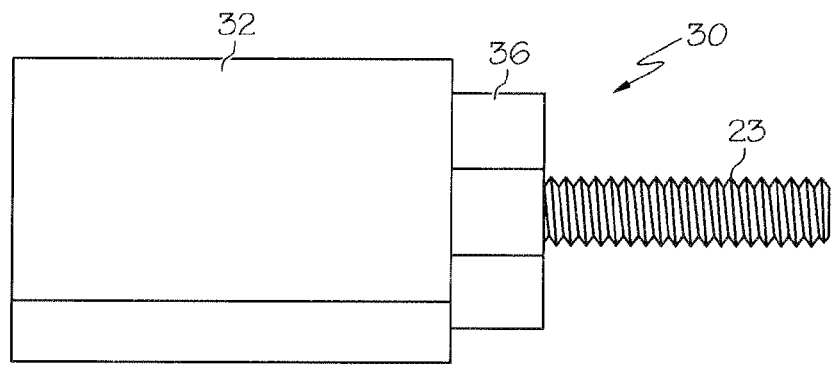
FIG. 3C is a side view of the assembled micro-coupling active release mechanism of FIG. 3A.
Figure 3D:
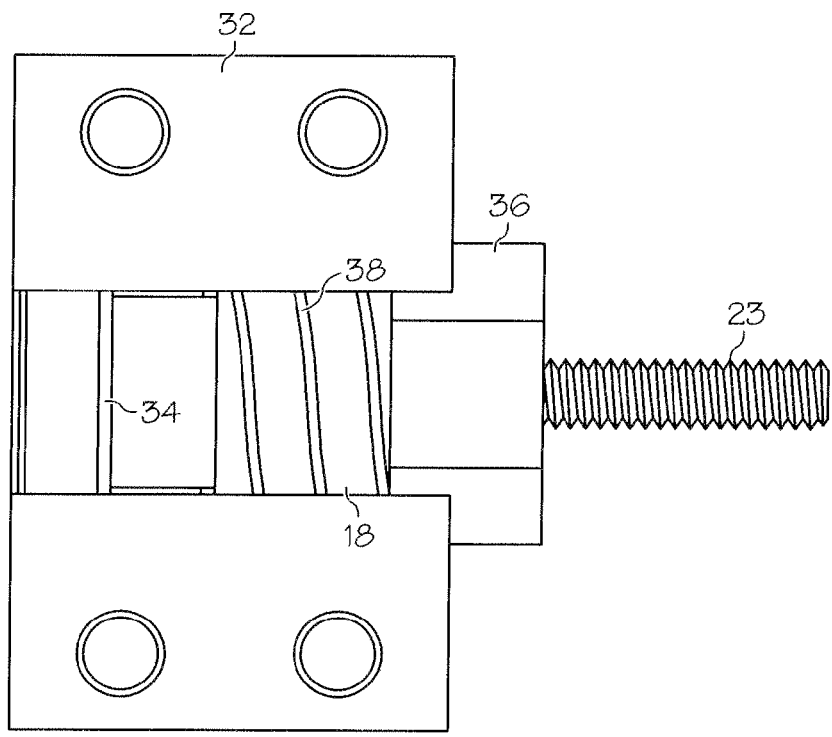
FIG. 3D is a bottom view of the assembled micro-coupling active release mechanism of FIG. 3A.

In one embodiment, SMA cylindrical ring 10 is press-fit into bushing 14 as earlier described with reference to FIGS. 1A, 1B and 1C. In one embodiment, SMA cylindrical ring 10 can be actively actuated by a heating device 18, such as a resistive heater, that can be conductively coupled to SMA cylindrical ring 10 or to bushing 14. For example, heating device 18 can be connected directly to SMA cylindrical ring 10 or wrapped around bushing 14 (as shown in FIGS. 2C and 2D).

In one embodiment, a retaining bolt 20 is passed through the interior diameter of SMA cylindrical ring 10 to secure SMA cylindrical ring 10 to the second component. In one embodiment, retaining bolt 20 includes a bolt shaft 23 having a first diameter, i.e., a bolt shaft diameter, and a bolt head 24 having a second diameter, i.e., a bolt head diameter. In one embodiment, the bolt shaft diameter of bolt shaft 23 is sized to pass through (e.g., within) the inner diameter of SMA cylindrical ring 10, but the bolt head diameter of bolt head 24 is larger than the inner diameter of SMA cylindrical ring 10 and smaller than the inner diameter of bushing 14 in austenitic phase. In this way bolt head 24 "catches" on SMA cylindrical ring 10 and cannot pass through SMA cylindrical ring 10. As seen in FIG. 2B, this allows a portion of bolt shaft 23 to extend out and from SMA cylindrical ring 10 for attachment to the second component. Thus in FIG. 2C, assuming bushing 14 is attached to the first component and SMA cylindrical ring 10 is attached to the second component (via retaining bolt 20), the first and second components are releasably coupled. In FIG. 2D, heating SMA cylindrical ring 10 results in the atomic transformation of SMA cylindrical ring 10 from its larger martensitic phase into its smaller diameter ("memory shape") austenitic phase. Once heated, SMA cylindrical ring 10 shrinks and releases from its press-fit to bushing 14, thereby allowing SMA cylindrical ring 10, along with retaining bolt 20, to slide out of bushing 14, releasing the coupling of the first and second components.

In one embodiment, if the material into which SMA cylindrical ring 10 is press-fit, i.e., the material of bushing 14, is not electrically conductive, direct electrical current can be passed through SMA cylindrical ring 10 to induce resistive heating and subsequent SMA cylindrical ring 10 activation. Passive SMA actuation techniques of SMA cylindrical ring 10, such as exposure to an intense indirect heat source, can also be used to actuate the release of the micro-coupling active release mechanism 22, i.e., release of the interference joint, in addition to adjusting the alloy's metal composition characteristics of SMA cylindrical ring 10 to change desired actuation temperatures.

Referring to FIGS. 3A through 3D, in one embodiment, a micro-coupling active release mechanism 30 including SMA cylindrical ring 10 and bushing 14 is positioned inside a mountable mechanism, housing 32. In one embodiment, the design of housing 32 can be adapted to accommodate the particular application of SMA micro-coupling active release mechanism 30. In one embodiment, housing 32 is utilized to attach to one of a coupled pair of components (not shown) while holding interference joint 12. In one embodiment, interference joint 12 is formed between SMA cylindrical ring 10 and bushing 14 as earlier described. Housing 32, for example, can be used to attach to a first component (not shown) while holding interference joint 12.

In one embodiment, retaining bolt 20 passes through SMA cylindrical ring 10, catching bolt head 24 such that a portion of bolt shaft 23 extends from SMA cylindrical ring 10 for attachment to a second component (not shown). In one embodiment, retaining bolt 20 can be made of titanium or a strong stainless steel alloy for high strength and low coefficient of thermal expansion. In one embodiment, the diameter of bolt shaft 23 is less than the inside diameter of SMA cylindrical ring 10 in its austenitic phase (i.e., less than the austenitic "memory" shape diameter) so as not to constrain the shrinkage of SMA cylindrical ring 10 upon actuation. In one embodiment, on release actuation, heating device 18 is activated and both bushing 14 and SMA cylindrical ring 10 are heated to a transformation temperature, e.g., an HTR temperature.

In one embodiment, a thermal isolation ring 34 can be used to isolate housing 32 from heating device 18 and heated bushing 14. Heating of bushing 14 and SMA cylindrical ring 10 together takes advantage of the thermal expansion of the inner diameter of bushing 14 and also the subsequent reduction of the outer diameter of SMA cylindrical ring 10 upon reaching the transformation temperature, e.g., HTR. The resulting differences in diameter release SMA cylindrical ring 10 from its assembled press-fit in bushing 14, thereby releasing retaining bolt 20 and SMA cylindrical ring 10 from bushing 14 and allowing separation of the first and second components (see FIG. 2D).

In some embodiments, a pusher plate 36 and an attached spring 38 can be included in micro-coupling active release mechanism 30. Pusher plate 36 and spring 38 can aid in separation of SMA cylindrical ring 10 and retaining bolt 20 by applying a pre-load to micro-coupling active release mechanism 30.

Referring to FIGS. 4A-4D, in one embodiment a micro-coupling active release mechanism 40 is illustrated installed in a nano-satellite 42. In one embodiment, micro-coupling active release mechanism 40 is microcoupling active release device such as microcoupling active release mechanism 30. In this embodiment, micro-coupling active release mechanism 40 is employed to releasably hold a retaining door 44 in place on nano-satellite 42 throughout launch and for at least a portion of a time while in orbit.

Figure 4B:
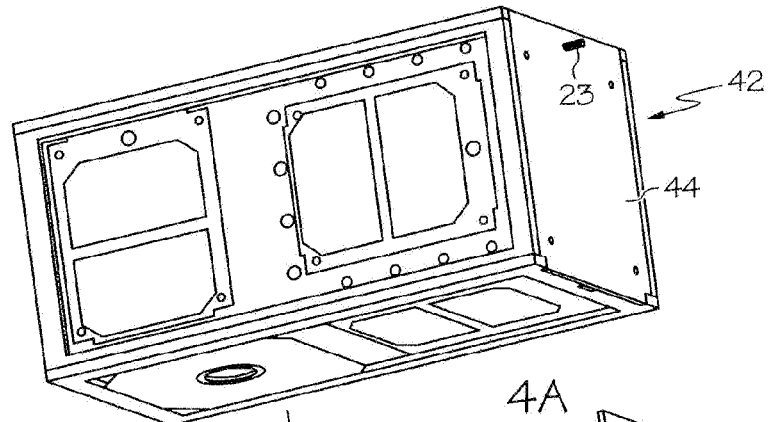
FIGS. 4B-4D are perspective views of one example of a micro-coupling active release mechanism assembled in a nano-satellite and used as the door release mechanism in accordance with one embodiment.
Figure 4C:
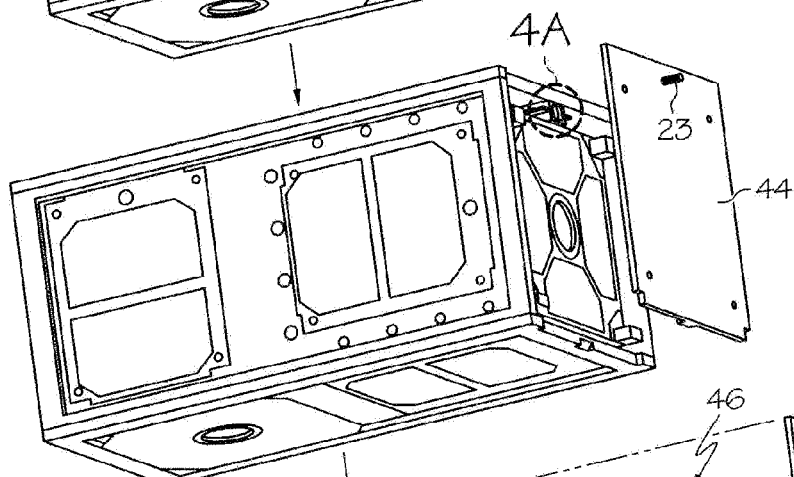
Figure 4D:
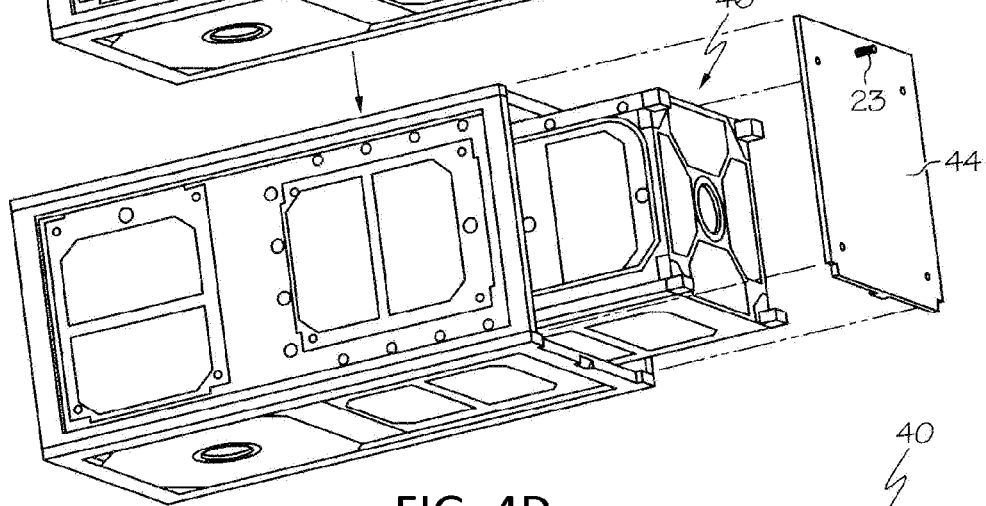
Figure 4A:
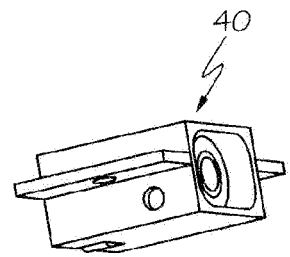
FIG. 4A is a close-up view of the micro-coupling active release mechanism.

In one embodiment, for purposes of description, microcoupling active release mechanism 40 is installed on nano-satellite 42 such that bushing 14 together with housing 32, heating device 18, push plate 26 and spring 38 are attached to nano-satellite 42 and SMA cylindrical ring 10 is attached to the interior side of retaining door 44 by retaining bolt 20. In FIGS. 4 and 4A, SMA cylindrical ring 10 and retaining bolt 20 of micro-coupling active release mechanism 40 are not shown, however it is understood that that these portions of micro-coupling active release mechanism 40 are present in the embodiment.

Initially, when retaining door 44 of nano-satellite 42 is closed, SMA cylindrical ring 10 is coupled with bushing 14 forming interference joint 12. On activation of micro-coupling active release mechanism 40, retaining door 44 separates from nano-satellite 42 allowing a smaller interior satellite 46 to be released. More specifically, on activation of micro-coupling active release mechanism 40, heating device 18 is activated such that SMA cylindrical ring 10 is heated to a transformation temperature, e.g., HTR, allowing SMA cylindrical ring 10 to release from the press-fit in bushing 14. SMA cylindrical ring 10 (with retaining bolt 20) and retaining door 44 then release from nano-satellite 42. In some embodiments, pusher plate 36 and spring 38 aid in separation of SMA cylindrical ring 10 with retaining door 44 by applying a pre-load to interference joint 12. With retaining door 44 removed, the smaller interior satellite 46 can be released.

Figure 5:
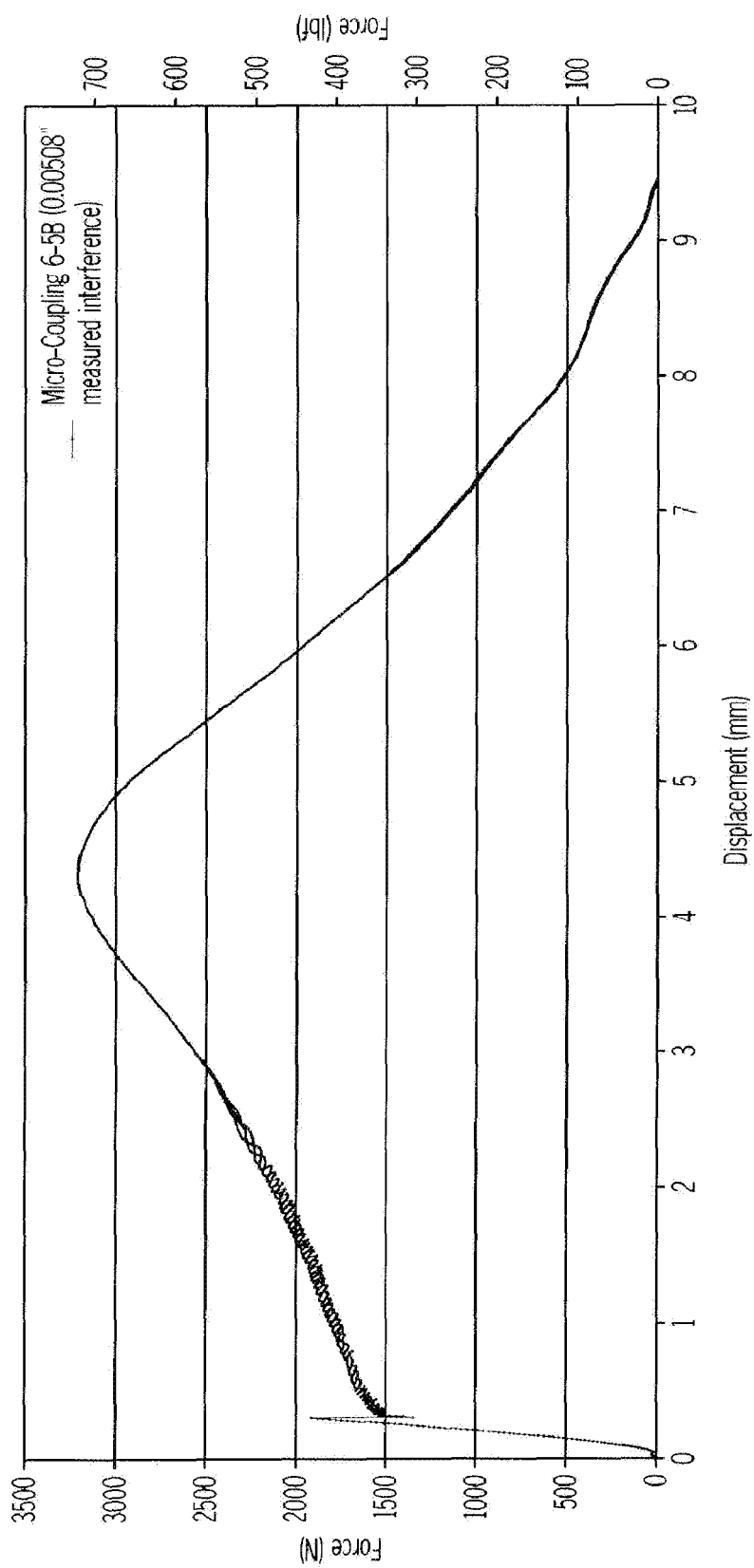
FIG. 5 is a graph showing coupling strength test data for the micro-coupling active release mechanism in accordance with one embodiment.

Referring to FIG. 5, coupling strength data is shown in a graph derived from a single micro-coupling test article when subject to forces great enough to forcefully extract SMA cylindrical ring 10 from its interference joint 12 in accordance with one embodiment. Coupling strength static friction peaks, maximum coupling strength, and kinetic friction slip transitions can be seen. The test data in the graph of FIG. 5 may be representative of multiple test articles.

In some applications, it may be desirable to form interference joint 12 without the use of a separate mountable bushing, e.g., bushing 14, and instead form a bushing-like recess, or other receiving space, in two components to be releasably coupled. Thus in another embodiment of micro-coupling active release mechanism, a first component and a second component to be coupled are releasably joined by forming a first hole in the first component and a second hole in the second component.

In one embodiment, the first hole and the second hole are formed to meet the tolerances needed to press-fit opposite end portions of SMA cylindrical ring 10 into each of the first hole and the second hole. In one embodiment, a first end portion of SMA cylindrical ring 10 is press-fit into the first hole of the first component, thereby leaving a second end portion of SMA cylindrical ring 10 exposed and available for press-fit into the second hole of the second component. In this embodiment, the material that SMA cylindrical ring 10 is press-fit into, i.e., material within which the first hole and second hole are formed, is of sufficient strength, has the proper surface finish for effective frictional coefficients, and has low thermal conductivity for implementation. In this embodiment, heating device 18 or other heat source is used to actuate SMA cylindrical ring 10 and decouple the first and second components. More specifically, as earlier described, SMA cylindrical ring 10 is heated to a specified HTR temperature or within a specified HTR temperature range causing SMA cylindrical ring 10 to shrink in diameter and release from the press-fit in the first hole and the second hole.

Embodiments in accordance with the micro-coupling active release mechanisms described herein are composed of few parts and can be formed to have small size and small mass. The design allows for large coupling strength and requires little power to actuate release. Those of skill in the art can understand that embodiments in accordance with the invention can also be scaled up in size to accommodate larger applications, but that accordingly more power may be needed to actuate release.

This disclosure provides exemplary embodiments of the invention. The scope of the invention is not limited by these exemplary embodiments. Numerous variations, whether explicitly provided for by the specification or implied by the specification or not, may be implemented by one of skill in the art in view of this disclosure.

We claim:

1. An active release mechanism comprising:
   a bushing connectable to a first component, the bushing having a recess;
   a shape memory alloy (SMA) cylindrical ring positioned within the recess and connectable to a second component, wherein the SMA cylindrical ring is press-fit into the recess of the bushing to form an interference joint that releases when the SMA cylindrical ring is heated to a transformation temperature that causes the SMA cylindrical ring to reduce in size;
   a retaining bolt for attaching the SMA cylindrical ring to the second component, the retaining bolt comprising:
      a bolt shaft having a bolt shaft diameter; and
      a bolt head having a bolt head diameter;
      wherein the bolt shaft diameter is smaller than an inner diameter of the SMA cylindrical ring; and
   wherein the bolt head diameter is larger than the inner diameter of the SMA cylindrical ring;
   wherein the bolt shaft passes through the inner diameter of the SMA cylindrical ring and extends out from the SMA cylindrical ring for attachment to the second component; and
   further wherein the bolt head does not pass through the inner diameter of the SMA cylindrical ring; and
   a heating device in contact with at least one of the bushing and the SMA cylindrical ring, the heating device for heating the SMA cylindrical ring to the transformation temperature,
   wherein when the interference joint is released, the SMA cylindrical ring and the retaining bolt separate from the bushing allowing the first component to separate from the second component.

2. The active release mechanism of claim 1, wherein the SMA cylindrical ring is made of a material that transforms at the transformation temperature from a larger martensitic phase diameter to a smaller austenitic phase diameter when heated at or above the transformation temperature.

3. The active release mechanism of claim 2, wherein the SMA cylindrical ring is formed of a pseudoelastic alloy that has an associated transformation temperature.

4. The active release mechanism of claim 1, wherein the heating device is in contact with the bushing and the SMA cylindrical ring such that the heating device heats both the SMA cylindrical ring and the bushing.

5. The active release mechanism of claim 1, wherein the heating device is an electrically resistive heater.

6. The active release mechanism of claim 1, wherein the heating device includes direct electrical current applied to the SMA cylindrical ring.

7. The active release mechanism of claim 1 further comprising:
   a housing enclosing at least a portion of the bushing such that a recessed end of the bushing is not enclosed to allow for receipt and release of the SMA cylindrical ring, the housing for connecting the bushing to the first component.

8. The active release mechanism of claim 7, further comprising:
   a spring disposed within the housing and surrounding the bushing, the spring having a preload; and
   a pusher plate disposed within the housing and connected to the spring, the pusher plate having a central aperture through which at least the SMA cylindrical ring and retaining bolt are insertable into and releasable from the bushing recess;
   wherein when the interference joint is released, the preload of the spring against the pusher plate aids in the separation of the SMA cylindrical ring and the retaining bolt from the bushing.

9. The active release mechanism of claim 1, wherein the SMA cylindrical ring is press-fit using a cold-press method.

10. The active release mechanism of claim 1, wherein the SMA cylindrical ring is press-fit using a shrink-fit method.

* * * * *